(12) United States Patent
Shekhar (10) Patent No.: US 9,680,785 B2
(45) Date of Patent: Jun. 13, 2017

(54) SECURE GEO-LOCATION OF A COMPUTING RESOURCE

(75) Inventor: Mrigank Shekhar, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 13/993,861

(22) PCT Filed: Dec. 29, 2011

(86) PCT No.: PCT/US2011/067901
§ 371 (c)(1),
(2), (4) Date: Nov. 15, 2013

(87) PCT Pub. No.: WO2013/101094
PCT Pub. Date: Jul. 4, 2013

(65) Prior Publication Data
US 2014/0304342 A1 Oct. 9, 2014

(51) Int. Cl.
*H04L 12/58* (2006.01)
*G01S 5/02* (2010.01)
(Continued)

(52) U.S. Cl.
CPC ............ *H04L 51/20* (2013.01); *G01S 5/0242* (2013.01); *G01S 13/825* (2013.01);
(Continued)

(58) Field of Classification Search
CPC ..... G01S 5/0242; G01S 13/825; H04L 51/20; H04L 67/1021; H04L 67/18; H04L 9/0877; H04L 2209/805; H04W 4/008
See application file for complete search history.

(56) References Cited

U.S. PATENT DOCUMENTS

| 5,781,703 A | 7/1998 | Desai et al. |
| 2004/0137917 A1 | 7/2004 | Ohto et al. |

(Continued)

FOREIGN PATENT DOCUMENTS

| CN | 104012033 A | 8/2014 |
| TW | I235299 B | 7/2005 |

(Continued)

OTHER PUBLICATIONS

"International Application Serial No. PCT/US2011/067901, Search Report mailed Sep. 24, 2012", 3 pgs.
(Continued)

*Primary Examiner* — Larry Donaghue
(74) *Attorney, Agent, or Firm* — Schwegman Lundberg & Woessner, P.A.

(57) ABSTRACT

Embodiments of systems and methods for geo-location of a computing resource are generally described herein. In some embodiments, a first computing device determines a geographical location of the first device. The first device accesses an identifier of a second computing device and associates the location with the second device. The first device transmits a notification of the location being associated with the second device to the second device. In response to receiving the notification, the second device periodically transmits a message to the first device. The second device may detect a disconnection of a wired connection coupling the second device with an external system. In response to the detection, the second device ceases the periodic transmission of the message. The first device dissociates the location from the second device based on an elapsed time period since reception of a most recent one of the messages exceeding a predetermined time period.

21 Claims, 7 Drawing Sheets

(51) Int. Cl.
*G01S 13/82* (2006.01)
*H04L 29/08* (2006.01)
*H04L 9/08* (2006.01)
*H04W 4/00* (2009.01)

(52) U.S. Cl.
CPC .......... *H04L 67/1021* (2013.01); *H04L 67/18* (2013.01); *H04L 9/0877* (2013.01); *H04L 2209/805* (2013.01); *H04W 4/008* (2013.01)

(56) References Cited

U.S. PATENT DOCUMENTS

| 2005/0044424 | A1 | 2/2005 | Xydis |
| 2005/0117587 | A1 | 6/2005 | Kawato |
| 2008/0008179 | A1 | 1/2008 | Chen et al. |
| 2009/0282140 | A1 | 11/2009 | White et al. |
| 2010/0115338 | A1 | 5/2010 | Rao et al. |
| 2010/0179819 | A1* | 7/2010 | Herbst .................. G06Q 10/10 705/2 |
| 2010/0312809 | A1 | 12/2010 | Calder et al. |
| 2011/0047263 | A1 | 2/2011 | Martins et al. |
| 2011/0083046 | A1* | 4/2011 | Andrade ............. G06F 11/0793 714/47.1 |
| 2011/0304463 | A1 | 12/2011 | Groth et al. |
| 2011/0314082 | A1 | 12/2011 | Koneti et al. |

FOREIGN PATENT DOCUMENTS

| TW | M382539 U | 6/2010 |
| TW | 201334488 A | 8/2013 |
| TW | I536787 B | 6/2016 |
| WO | WO-2013101094 A1 | 7/2013 |

OTHER PUBLICATIONS

"International Application Serial No. PCT/US2011/067901, Written Opinion mailed Sep. 24, 2012", 5 pgs.

"Chinese Name Application Serial No. 201180075987.8, Office Action mailed Jul. 22, 2016", W/ Machine Translation, 6 pgs.

"European Application Serial No. 11878684.7, Extended European Search Report mailed Jul. 27, 2015", 5 pgs.

"European Application Serial No. 11878684.7, Response filed Feb. 19, 2016 to Extended European Search Report mailed Jul. 27, 2015", W/ English Translation, 15 pgs.

"International Application Serial No. PCT/US2011/067901, International Preliminary Report on Patentability mailed Jul. 10, 2014", 7 pgs.

"Taiwanese Application Serial No. 101147514, Office Action mailed Aug. 17, 2015", W/ Search Report Translation, 11 pgs.

"Taiwanese Application Serial No. 101147514, Office Action mailed Nov. 21, 2014", W/ Translated Search Report, 12 pgs.

"Taiwanese Application Serial No. 101147514, Response filed Jan. 8, 2016 to Office Action mailed Aug. 17, 2015", W/ English Claims, 98 pgs.

"Taiwanese Application Serial No. 101147514, Response filed Feb. 24, 2015 to Office Action mailed Nov. 21, 2014", W/ English Claims, 22 pgs.

"Chinese Name Application Serial No. 201180075987.8, Response filed Dec. 29, 2016 to Office Action mailed Jul. 22, 2016", w/English Claims, 21 pgs.

* cited by examiner

SECURE GEO-LOCATION OF A COMPUTING RESOURCE

This application is a U.S. National Stage Filing under 35 U.S.C. 371 from International Application No. PCT/US2011/067901, flied on Dec. 29, 2011, which is incorporated herein by reference in its entirety.

TECHNICAL FIELD

Embodiments pertain generally to computing resources. Some embodiments relate to secure geo-location of one or more computing resources.

BACKGROUND

In many distributed computing environments, such as cloud computing systems, the actual computing resource employed to perform a particular task, execute a particular application, or perform some other computer-related function, may be selected from multiple computing resources located in diverse geographical locations. For example, a particular function may be performed by way of a virtual machine (VM), which may in turn be executed on any number of physical, geographically diverse computing platforms or systems. In some cases, a computing services subscriber requesting the performance or execution of the function from a computing services provider may require that the performance occur subject to one or more geographical restrictions by way of a service level agreement (SLA) between the services subscriber and the services provider. For example, the subscriber may require that the function be performed within a particular country or jurisdiction, such as within the borders of the United States, due to corporate privacy concerns, national export restrictions, business or government contractual requirements, information discovery needs, and the like. Additionally, the subscriber may require that the provider facilitate independent verification of compliance with the geographical restrictions, possibly at runtime.

Typically, to satisfy geographical provisions in an agreement with a services subscriber, a services provider manually enters information identifying the geographical location of each specific computing resource, such as a cloud server, into a database. In addition, the services provider normally updates the database from time to time to reflect recent changes in server locations. As a result, such a process may be subject to human error or intentional misrepresentation.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various embodiments described herein provide systems and methods for providing secure geographical location ("geo-location") of one or more computing devices, such as cloud servers. As discussed in greater detail below, by securely determining a location of a target server, and providing a mechanism whereby disconnection of the target server from its operating environment is detected, a subscriber to the services provided via the target server may either retrieve the actual location of the target server or discover that the location of the target server is currently unknown. Further, the embodiments described below may help prevent human error or intentional misrepresentation in providing and updating the geo-location information. Other potential benefits and advantages of the various embodiments may be ascertained from the description provided hereinafter.

Figure 1:
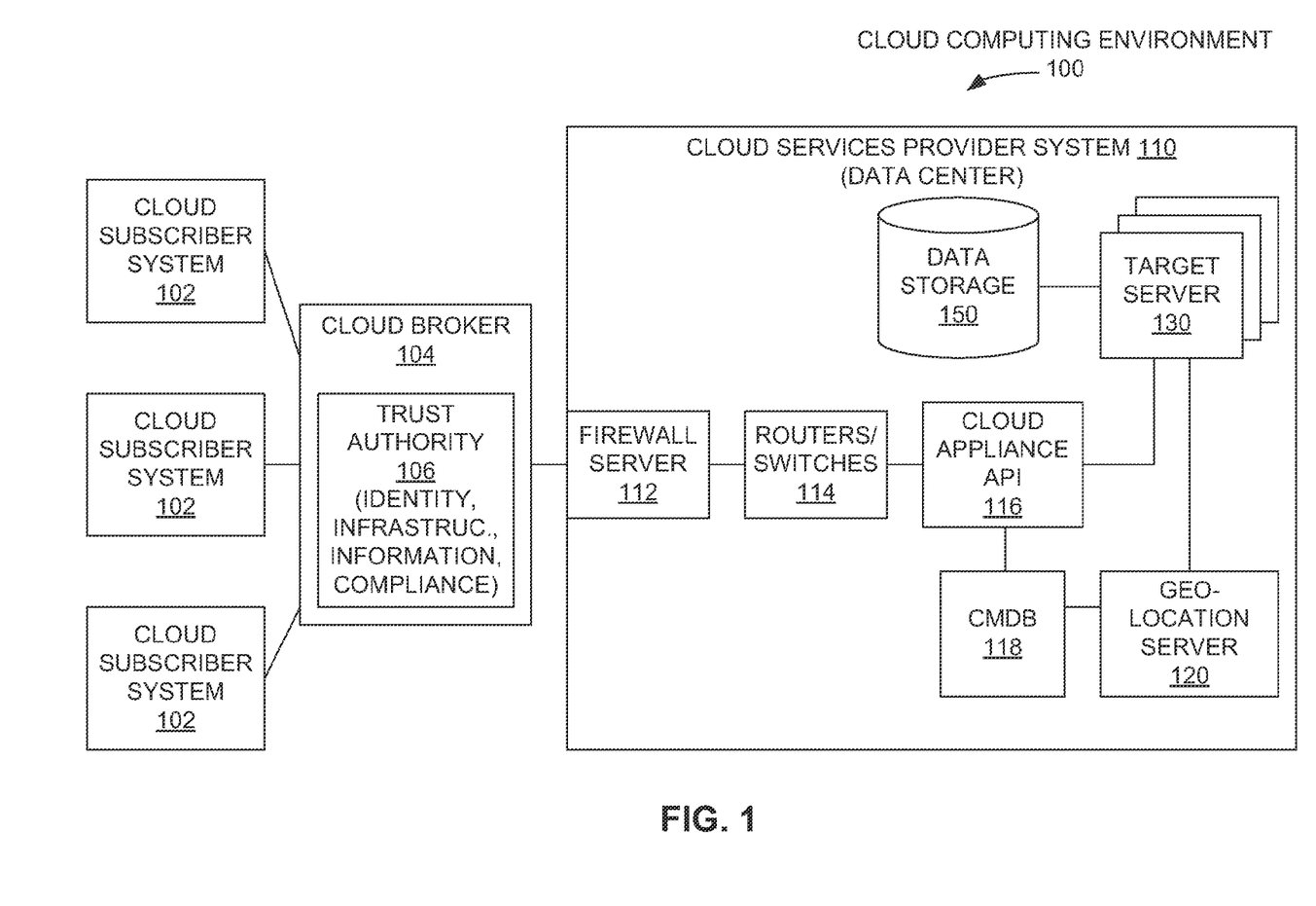
FIG. 1 is a functional diagram of a cloud computing environment in accordance with some embodiments.

FIG. 1 is a block diagram of a cloud computing environment 100 in which multiple cloud subscriber systems 102 access computing services provided by a cloud services provider system 110. While the majority of the description below focuses on the geo-location of computing resources within the cloud services provider system 110, the systems and methods discussed herein are not limited to such an environment 100, but may be applied to any computing, processing, or communication context in which the secure determination of a geographical location of a device or system is desired.

In the cloud computing environment 100 of FIG. 1, the cloud subscriber systems 102 access the cloud services provider system 110 through a cloud broker 104. In one example, the cloud broker 104 may connect cloud subscriber systems 102 with cloud services provider systems 10 that are compatible with the cloud subscriber systems 102 from a data interface perspective, as both the cloud subscriber systems 102 and the various cloud services provider systems 110 may be heterogeneous, with each employing different operating systems, hardware platforms, applications, and the like.

In addition, the cloud broker 104 may receive requests from cloud subscriber systems 102 for services that adhere to one or more requirements specified by the requesting cloud subscriber system 102. Such requirements may include, for example, the availability of one or more specific applications, the minimum data storage capacity desired, or the processing bandwidth needed. In addition, the requesting cloud subscriber system 102 may specify a particular geographical region in which the actual execution of the services is to occur. The cloud broker 104 may then communicate with one or more cloud services provider systems 110 to determine which such systems 110 adhere to the requirements set forth by the requesting cloud subscriber system 102. To perform these functions, the cloud broker 104 may employ a trust authority 106, which may facilitate and monitor cloud security and auditing relating to subscriber identity, infrastructure, information, and service level agreement compliance.

The cloud services provider system 110, which may be located within a single data center, may include one or more target servers 130 and associated data storage 150 for providing the computing services requested by the cloud subscriber systems 102. To facilitate secure and protected access to the target servers 130, the cloud services provider system 110 may employ a firewall server 112 and one or more network routers and/or switches 114.

Also included in the cloud services provider system 110 is a cloud appliance application programming interface (API) 116, which provides an interface for the cloud broker 104. Thus, the cloud appliance API 116 may provide responses to various requirement queries from the cloud broker 104, including queries related to a subscriber SLA, such a geo-location-compliant resource availability requirement. Information employable for responding to these queries may be provided in a configuration management database (CMDB) 118. In the various embodiments described herein, among the information stored in the CMDB 118 is the current geo-location of the target servers 130.

To generate the current geo-location information, the cloud services provider system 110 employs a geo-location server 120 in communication with the target servers 130 to determine and update the geo-location of each target server 130 in a secure manner.

Figure 2:
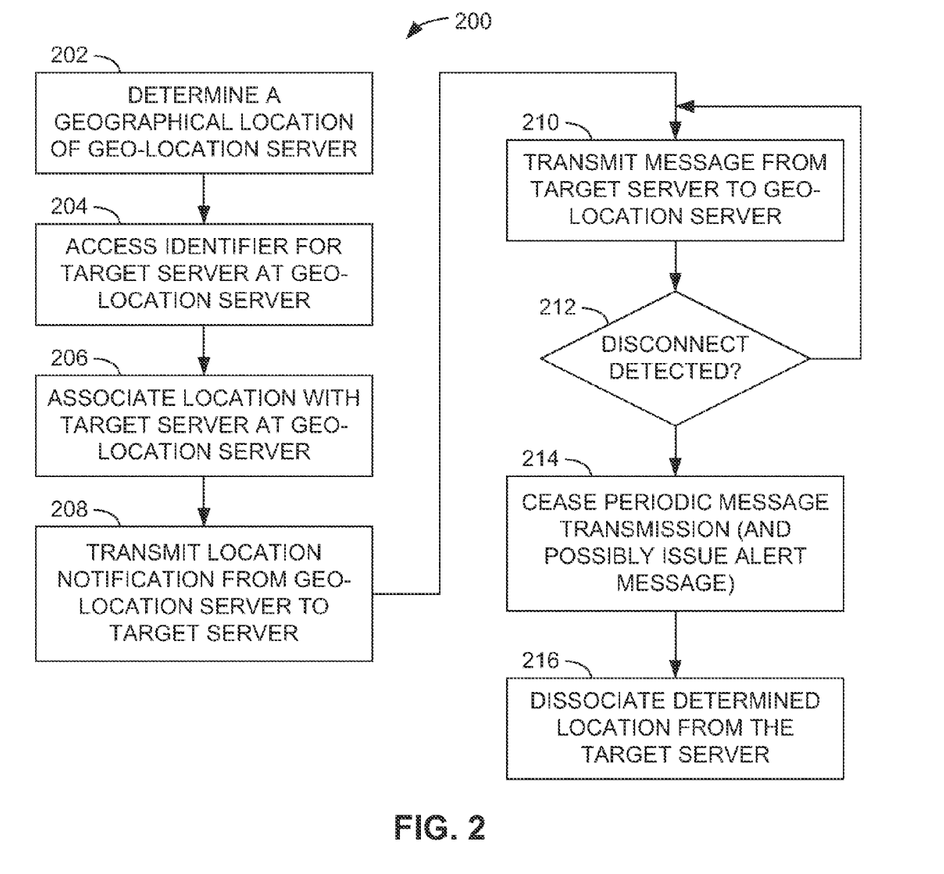
FIG. 2 is a flow diagram of a method of providing and updating the geographical location of a target server in accordance with some embodiments.

FIG. 2 is a flow diagram of a method 200 of providing and updating the geographical location of one of the target servers 130 in an example embodiment. In the method 200, the geo-location server 120 determines its geographical location (operation 202). As is described in greater detail below, the geo-location server 120, in one example, may employ the Global Positioning System (GPS) or another technology for accurately determining its current location. The geo-location server 120 also accesses an identifier for the target server 130 (operation 204). In one example, the geo-location server 120 may receive the identifier via a separate device, such as from an RFID tag physically attached to the target server 130, which an RFID reader or scanner may read. The RFID reader may then provide the identifier it read from the tag to the geo-location server 120. The geo-location server 120 may then associate the determined geographical location with the target server 130 (operation 206). In response to the association, the geo-location server 120 may then transmit a location notification to the target server 130 (operation 208), thus indicating that the location of the target server 130 has been determined, and placing the target server 130 in a mode in which the target server 130 may report activity which may render the location of the target server 130 unreliable.

To indicate to the geo-location server 120 that the target server 130 affirms or attests to the viability of the geo-location determination, the target server 130 periodically transmits a message (termed herein a "heartbeat" message) to the geo-location server 120 (operation 210) to indicate that the determined location of the target server 130 remains valid. While the target server 130 periodically transmits the message, the target server 130 also monitors whether the target server 130 has been disconnected from an external system, such as a power connection or a wired communication connection (operation 212). If not, the target server 130 continues to transmit the heartbeat message periodically (operation 210). Otherwise, if the target server 130 detects a disconnection, the target server 130 ceases the continued transmission of the heartbeat message (operation 214). In response to the cessation of the message transmissions, the geo-location server 120 may dissociate the determined location from the target server 130 (operation 216). Further, the geo-location server 120 may update each status change of the geo-location determination of the target server 130 to the CMDB 118 or another external device.

While the operations 202-216 of the method 200 of FIG. 2 are presented in a specific serial fashion, other orders of operations, including concurrent execution of one or more operations, may be possible in other implementations. For example, the determination of the geographical location (operation 202) and the access of the target server 130 identifier may occur concurrently, or in an opposing order from that depicted in FIG. 2.

In another embodiment, instead of the target server 130 periodically transmitting a heartbeat message to the geo-location server 120 (operation 210), the geo-location server 120 may periodically transmit a polling message to the target server 130. If the geo-location server 120 does not receive a response from the target server 130 within a predetermined period of time after transmission of one of the polling messages, the geo-location server 120 may determine that the determined location of the target server 130 may be unreliable. As a result, the geo-location server 120 may then dissociate the previously determined location from the target server 130 and update the status of the geo-location determination of the target server 130 to the CMDB 118, as discussed above.

Figure 3:
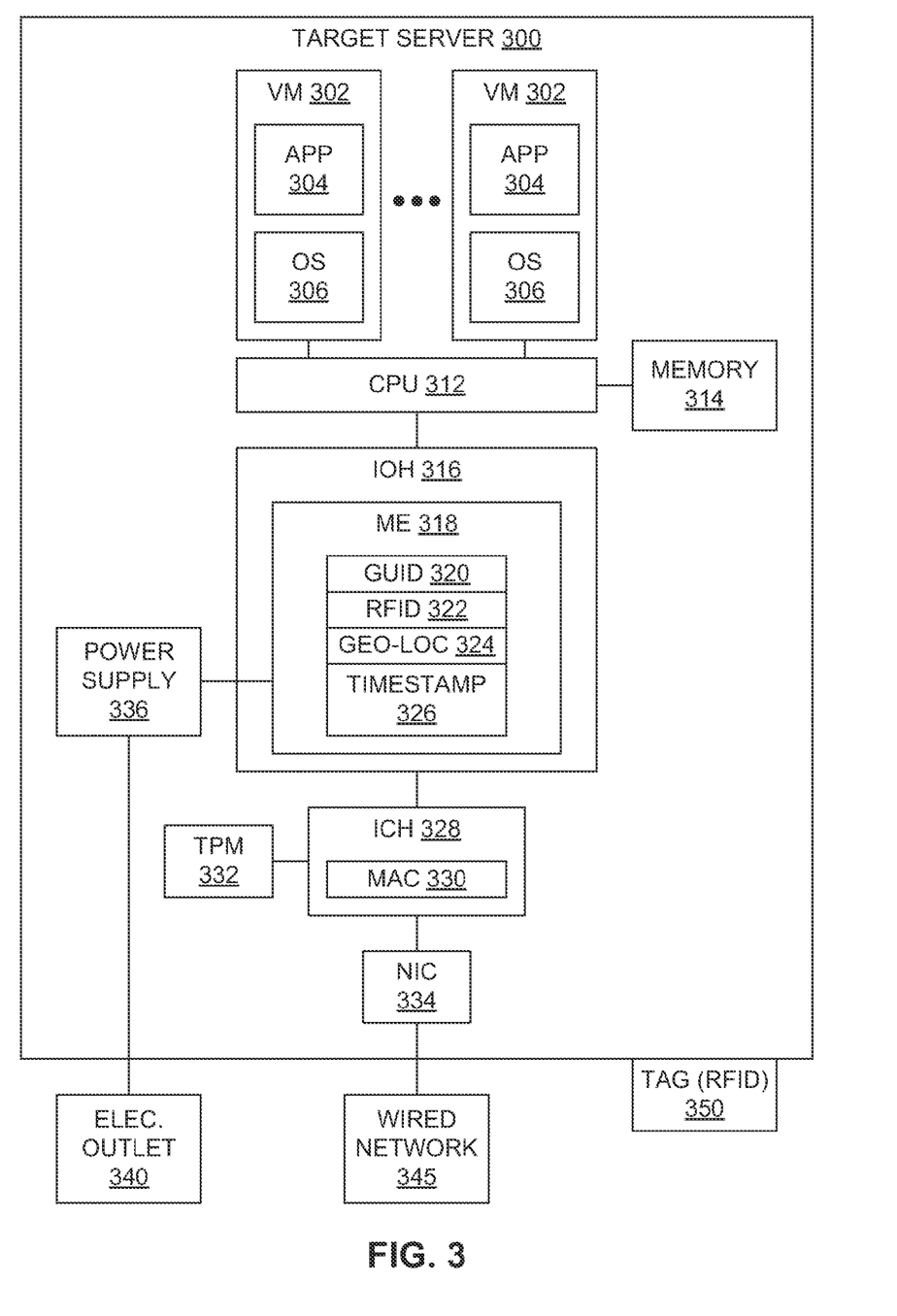
FIG. 3 is a block diagram of a target server of a cloud computing environment in accordance with some embodiments.
Figure 4:
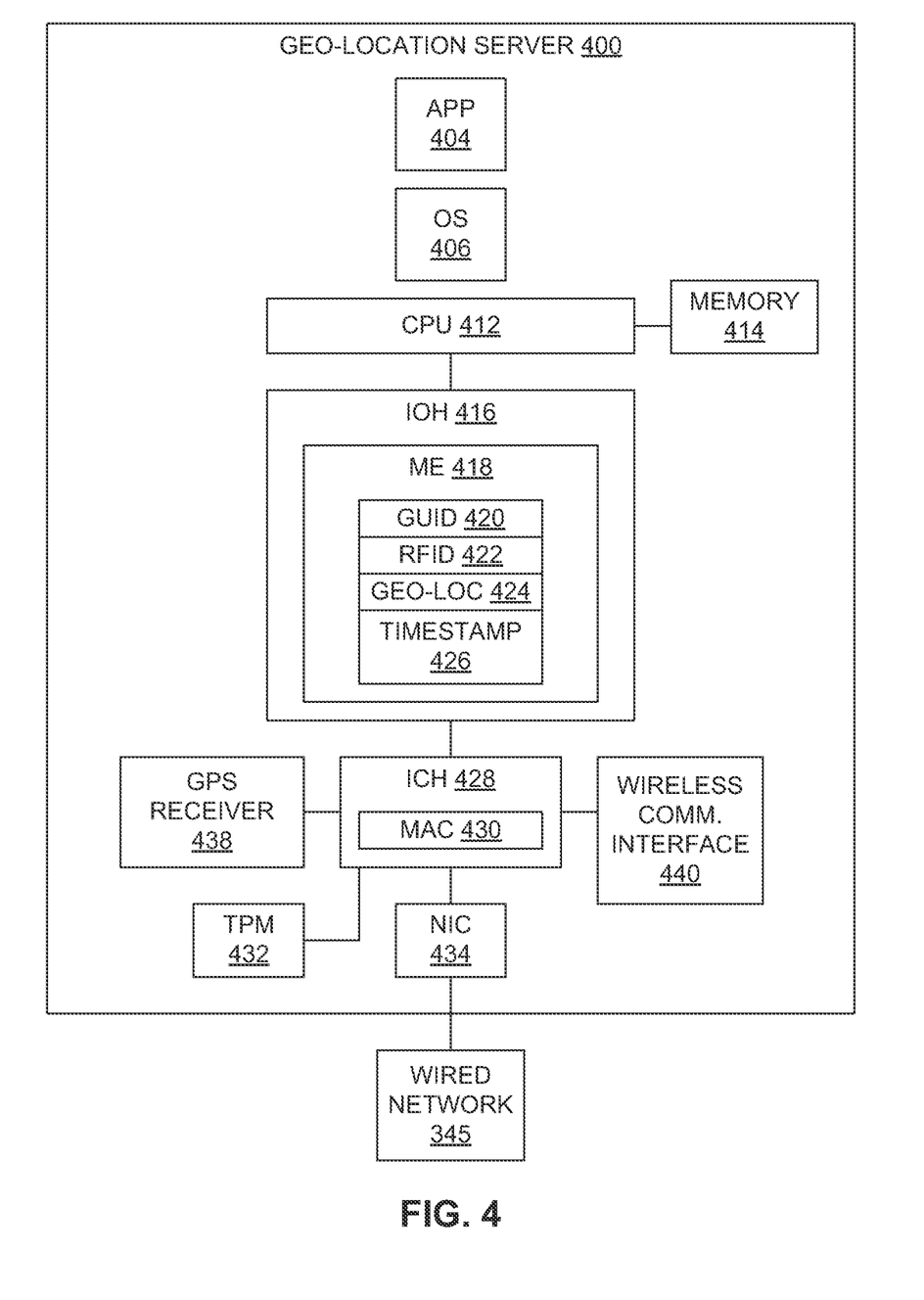
FIG. 4 is a block diagram of a geo-location server of a cloud computing environment in accordance with some embodiments.

FIGS. 3 and 4 are block diagrams of an example target server 300 and an example geo-location server 400, respectively. In at least some examples, the target server 300 of FIG. 3 may be employed as the target server 130 of FIG. 1, and the geo-location server 400 of FIG. 4 may be utilized as the geo-location server 120 of FIG. 1. While the target server 300 and the geo-location server 400, as described below, each generally employs an architecture based upon components provided by Intel® Corporation of Santa Clara, Calif., other platform architectures, including those based on alternative processors and chipsets, may be used in other embodiments.

The target server 300 of FIG. 3 is based on a central processing unit (CPU) 312 that may include one or more processing cores, memory caches, and support circuitry, and may access memory 314 for accessing and storing executable instructions, program data, and other information. Executing on the CPU 312 may be one or more virtual machines (VMs) 302, with each VM 302 providing an instance of an operating system (OS) 306 upon which one or more applications (APPs) 304 may execute. In some examples, a VM 302 is generated and executed on any of a number of target servers 300 in response to a request from a cloud subscriber system 102 (FIG. 1) to a cloud services provider system 110 to provide a particular service, presuming the target server 300 hosting the VM 302 comports with any geographical limitations imposed in the SLA associated with the requesting cloud subscriber system 102.

Coupled with the CPU 312 may be an input/output hub (IOH) 316 hardware component, which may include a management engine (ME) 318. Further, the management engine 318 may include a microcontroller, flash memory for firmware and data storage, and internal random access memory (RAM). The management engine 318 may be coupled to peripheral components, such as a Trusted Platform Module (TPM) 332, a network interface controller (NIC) 334, and/or a power supply 336 receiving power via an electrical outlet 340. The management engine 318 may be coupled to one or more of the peripheral components either directly or through an input/output controller hub (ICH) 328 by way of a "sideband" control interface. Examples of a sideband interface include, but are not limited, to an Inter-Integrated Circuit (I2C) bus, a Reduced Media Independent Interface (RMII) bus, or a Fast Management Link (FML) interface. In addition, the management engine 318 may be configured to operate while the target server 300 is operating solely on standby power, thus allowing the management engine 318 to continue to function during times in which the primary CPU 312 of the target server 300 is in an idle or standby state to conserve power.

The management engine 318 may provide protected access to a number of values to be used in the geo-location process, possibly including, but not limited to, a globally-unique identifier (GUID) 320 for the target server 300, a radio-frequency identifier (RFID) 322 for the target server 300, a geo-location value 324, and a timestamp 326. A description of how these values are generated and employed is described in greater detail below.

As mentioned above, the input/output controller hub 328 facilitates access to peripheral components, such as the Trusted Platform Module 332 and the network interface card 334. As shown in FIG. 3, the input/output controller hub 328 may include a media access controller (MAC) 330, which facilitates addressing and channel access control for communicating through the network interface controller 334 over a wired network 345 with external devices, such as the geo-location server 400 of FIG. 4.

In FIG. 4, the geo-location server 400 provides similar architecture to that employed in the target server 300 of FIG. 3, although other platform architectures may be employed in other embodiments. The geo-location server 400 may include, for example, a CPU 412 and associated memory 414, upon which an operating system (OS) 406 supporting one or more applications (APPs) 404 may be executed. Coupled to the CPU 412 may be an input/output hub (IOH) 416, including a management engine 418. Further, the management engine 418 may create and maintain a number of values for each of a number of target servers 300, possibly including, but not limited to, a GUID 420, an RFID 422, a go-location value 424, and a timestamp 426.

As with the target server 300, the geo-location server 400 may also include an input/output controller hub (ICH) 428 with a media access controller 430 for communicating via a network interface controller 434 and a wired network 345. The ICH 428 may also interface with a Trusted Platform Module (TPM) 432. In addition, the ICH 428 may be coupled with a Global Positioning System (GPS) receiver 438 and a wireless communication interface 440, such as an Institute of Electrical and Electronics Engineers (IEEE) 802.11x interface (also known as a Wi-Fi® interface) located within, or attached to, the geo-location server 400.

Figure 5:
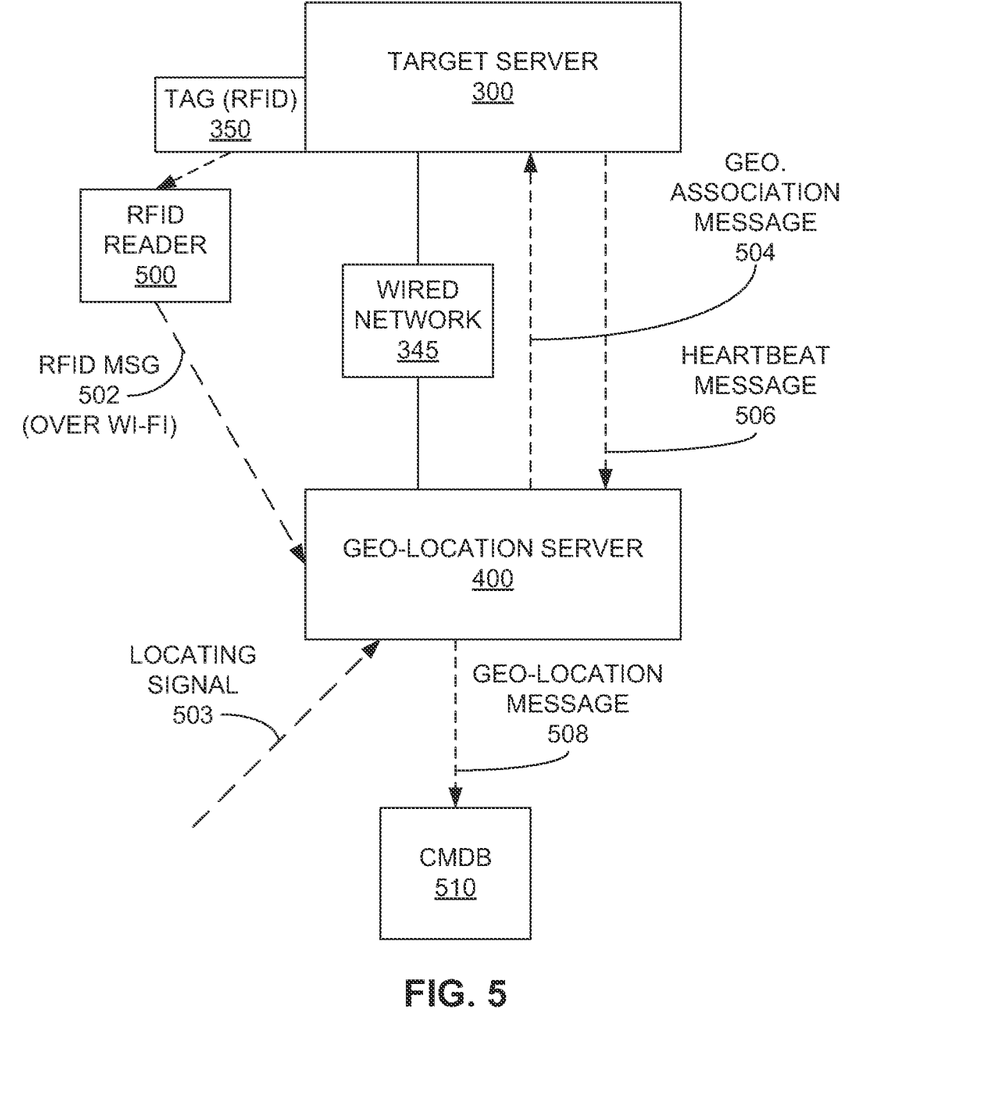
FIG. 5 is a block diagram of a target server and a geo-location server in communication for geo-location of the target server in accordance with some embodiments.

FIG. 5 is a block diagram of a target server and a geo-location server in communication for geo-location of the target server in accordance with some embodiments. In particular, FIG. 5 is a block diagram that graphically summarizes communications between the target server 300 and the geo-location server 400 to determine and update the geo-location of the target server 300 in one example. An RFID reader 500 with a wireless interface (for example, a Wi-Fi® interface) is used to read the RFID of an RFID tag 350 (FIG. 3) securely attached to an outer surface of the target server 300. The RFID reader 500 then transmits an RFID message 502 wirelessly to the go-location server 400. The go-location server 400 also receives at least one location signal 503, such as a GPS signal, to determine the location of the geo-location server 400. Since the RFID reader 500 must be closely located to the RFID tag 350 to read the RFID, and due to the limited range associated with the wireless interface, the reception of the RFID message 502 at the geo-location server 400 indicates that the target server 300 is close enough to the geo-location server 300 that geographical location information for the geo-location server 400 derived from the locating signal 503 may be applied to the target server 300.

The geo-location server 400 may then associate the RFID of the target server 300 with the determined location of the geo-location server 400, and transmit a geographical association message 504 indicating the association to the target server 300. In response to receiving the geographical association message 504, the target server 300 is informed that the geo-location server 400 has determined a geographical location for the target server 300, thus causing the target server 300 to begin transmitting heartbeat messages 506 periodically to the geo-location server 400 indicating a continued presence of the target server 300 at the current geo-location. In response to either the transmission of the geographical association message 504 or the reception of the heartbeat message 506, the geo-location server 400 may also transmit a geo-location message 508 to a configuration management database (CMDB) 510, which may be the CMDB 118 of FIG. 1 in one implementation.

If the target server 300 detects activity indicative of a potential change in geo-location, such as a disconnection of the target server 300 from an external system (e.g., a power system or a communication system), the target server 300 ceases transmission of the heartbeat messages 506, indicating to the geo-location server 400 that the current location of the target server 300 may have changed. In addition, the target server 300 may issue an alert message indicating the potential location change. In some examples, one or more of the messages 504, 506, 508 transmitted between the target server 300, the geo-location server 400, and the CMDB 510 may be encrypted by the transmitting device, and decrypted and/or validated by the receiving device. Examples of encryption may include those provided via Public Key Infrastructure (PKI) and associated digital certificates.

Figure 6A:
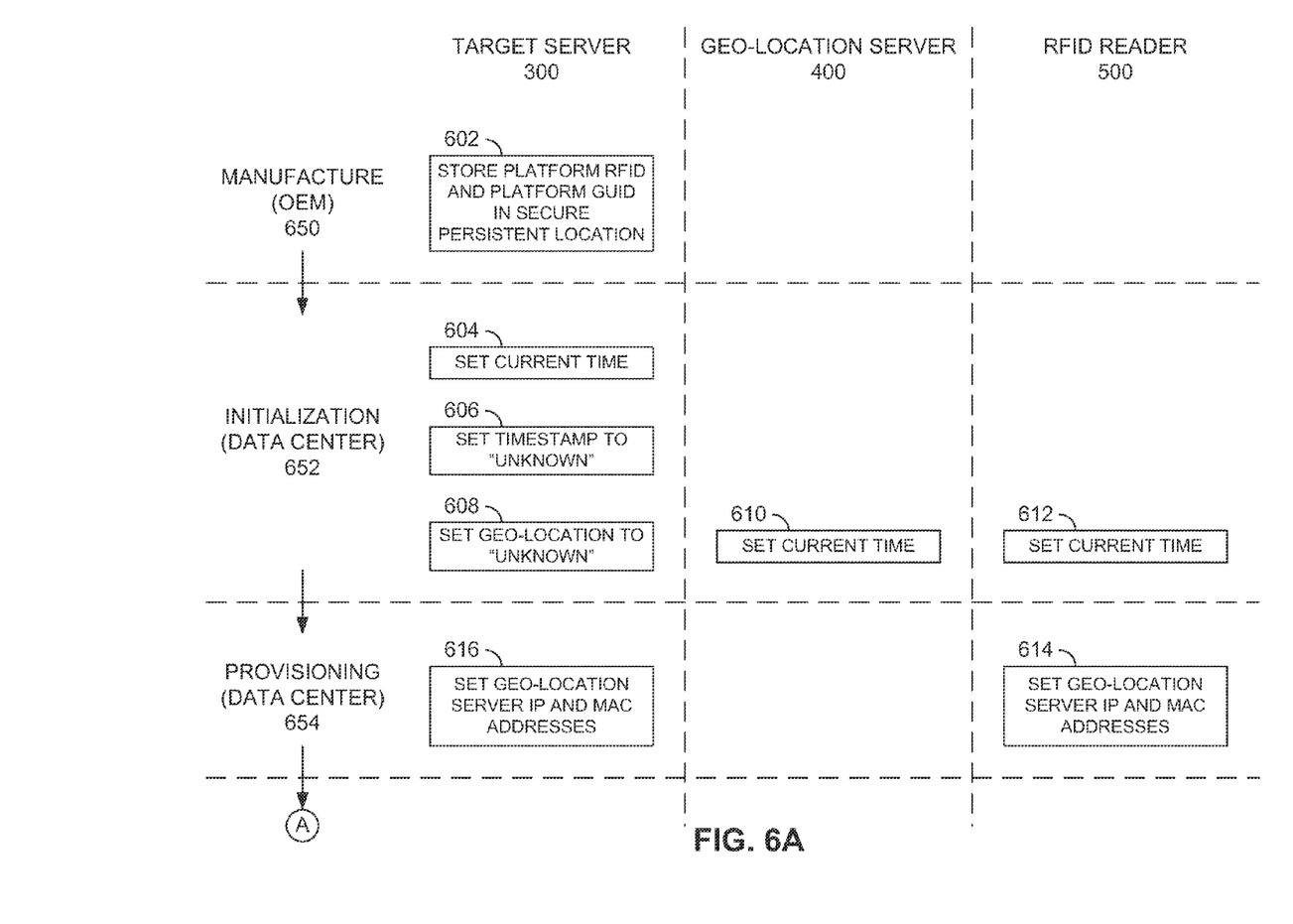
FIGS. 6A and 6B illustrate the operation of a target server, a geo-location server, and a radio-frequency identification (RFID) reader in accordance with some embodiments.
Figure 6B:
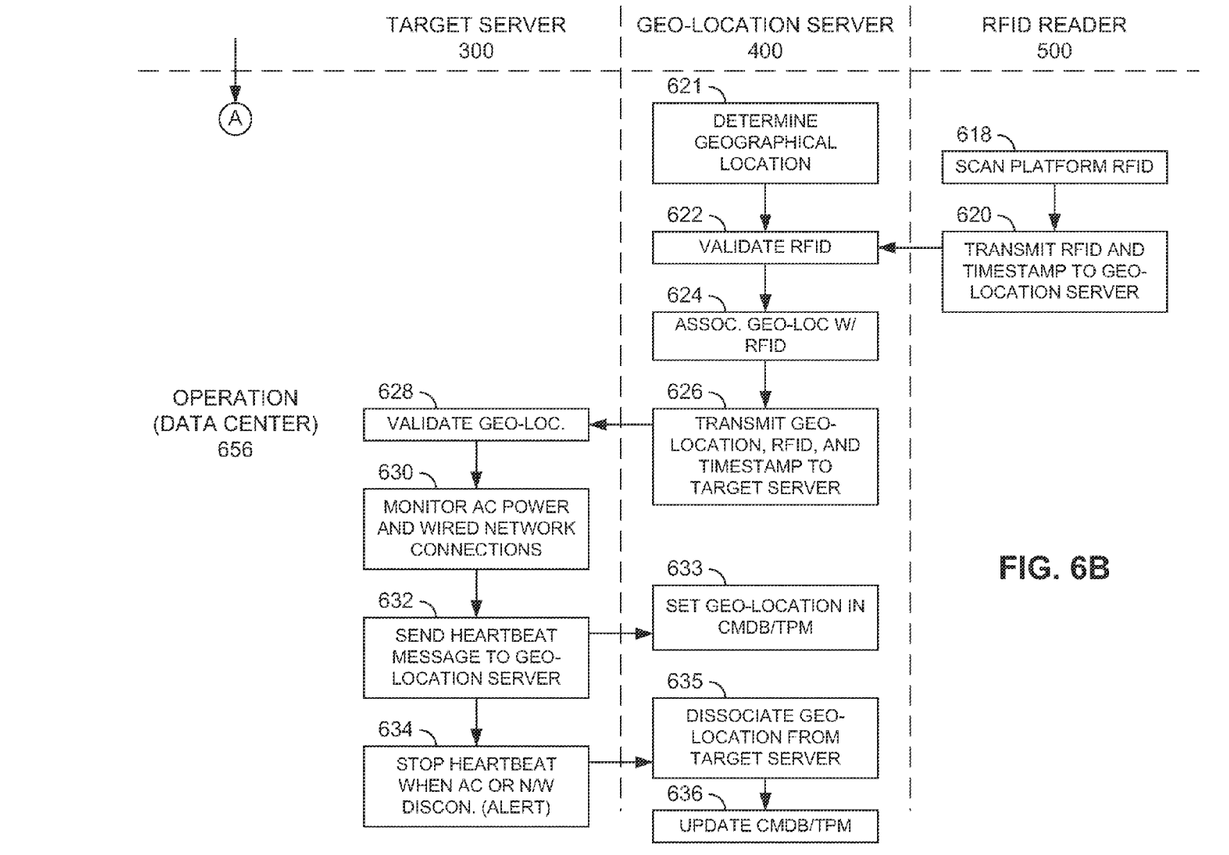

FIGS. 6A and 6B illustrate the operation of a target server, a geo-location server, and a radio-frequency identification (RFID) reader in accordance with some embodiments. In particular, FIGS. 6A and 6B present a diagram denoting a set of example operations executed by each of the target server 300, the geo-location server 400, and the RFID reader 500 of FIG. 5. As shown, the operations are divided into four general time periods: a manufacturing period 650, during which the target server 300 is manufactured, such as by an original equipment manufacturer (OEM) prior to being provided to a customer; an initialization period 652, during which the target server 300, the geo-location server 400, and the RFID reader 500 are to be placed into service in a data center; a provisioning period 654, during which the target server 300 and the RFID reader 500 are provisioned to communicate with the geo-location server 400; and an operation period 656, during which the normal operation of the target server 300, the geo-location server 400, and the RFID reader 500 proceeds.

During the manufacturing period 650 of the target server 300, the manufacturer stores a platform RFID and a platform GUID for the target server 300 in a secure persistent memory location of the target server 300 (operation 602). The manufacturer may also attach an RFID tag 350 (FIG. 3) containing the same platform RFID to an outside surface of the target server 300 to facilitate reading of the RFID by an RFID reader 500 (FIG. 5). In one example, the platform RFID and GUID are stored in flash memory private to the maintenance engine 318 (FIG. 3), or in the TPM 332 (also FIG. 3), as GUID 320 and RFID 322 (FIG. 3). Generally, the TPM 332 includes a processor that can store cryptographic keys that encode or encrypt information, such as the RFID 320 and the GUID 322. The management engine 318 may be configured to read the GUID 320 and the RFID 322 at any time, including when the target server 300 is placed in a standby or idle mode. Additionally, the management engine 318, possibly by way of its operating firmware, may be prevented from changing the GUID 320 and the RFID 322 after the target server 300 is manufactured and shipped to the customer.

In some implementations, additional RFID tags may be employed to denote a more specific location of the target server 300 within the data center. For example, an RFID tag may be attached to each group or "pod" of target servers 300 located in a particular row, cabinet, and/or shelf location of the data center.

During the initialization period 652, in which the target server 300, the geo-location server 400, and the RFID reader 500 are initialized in the data center in which they are to operate, the management engine 318 or another portion of the target server 300 sets the current time for the target server 300 (operation 604). The management engine 318 may also set the current geo-location value 324 and the associated timestamp 326 (FIG. 3) to an "unknown" or "undetermined" state (operations 606 and 608). As with the GUID 320 and the RFID 322, the current geo-location value 324 and the timestamp 326 may reside in a protected or private memory area accessible only via the management engine 318. In one implementation, the initialization of the current time, the timestamp, and the geo-location value occurs when a power source is connected to the target server 300, or when an explicit reset of the target server 300 is performed.

Also, during the initialization period 652, the geo-location server 400 sets its maintained current time (operation 610) and the RFID reader 500 initializes its own current time value (operation 612). In one example, the current time values of the target server 300, the geo-location server 400, and the RFID reader 500 are maintained to agree with one another within some predetermined margin of error, such as, for example, +/−1 millisecond (msec). In some implementations, these current time value are set based on input from a single time source, such as a time source available via the Internet, via wireless signals, or via other means.

During the provisioning period 654, the RFID reader 614 and the target server 300 set Internet Protocol (IP) and media access control (MAC) addresses for the geo-location server 400 in order to communicate with the geo-location server 400. In one example, the management engine 318 (FIG. 3) is responsible for setting those values in the target server 300.

In the operation period 656, illustrated in FIG. 6B, a user, such as a data center employee, uses the RFID reader 500 to scan the RFID tag 350 (FIG. 3) to read the platform RFID (operation 618). The RFID reader 500 may also note the current time at which the RFID tag 250 was read. The RFID reader 500 may then transmit the platform RFID and noted timestamp in an RFID message 502 (FIG. 5) to the geo-location server 400 (operation 620). As noted above, the RFID reader 500 may transmit the RFID message 502 wirelessly to the wireless communication interface 440 (FIG. 4) of the geo-location server 400, which may be a Wi-Fi® interface or another interface in which the range of the wireless communications is limited to a distance not considered significant from the standpoint of a geo-location requirement in a subscriber SLA. In some examples, the maximum range of a Wi-Fi® connection can be considered to be less than 230 feet. In one example, the RFID reader 350 may employ a secure peer-to-peer Wi-Fi® interface with the geo-location server 400 to provide additional confidence that the RFID value being received at the geo-location server 400 is valid. In some implementations, the RFID message 502 is encoded or encrypted to prevent interception and/or tampering.

Also during the operation period 656, the geo-location server 400 may determine its current geographical location (operation 621), which also serves as the geo-location for any target servers 300 in close proximity to the go-location server 400, such as those target servers 300 within the same data center. In one example, the geo-location server 400 receives and interprets locating signals 503 (FIG. 5) by way of the GPS receiver 438 (FIG. 4). In some implementations, the GPS receiver 438 is located within the chassis of the geo-location server 400. Further, the geo-location server 400 may be configured to detect chassis intrusion and/or disconnection of the GPS receiver 438 to invalidate the determined geographical location. The geo-location server 400, in many situations, may be located near a window or similar structural opening to facilitate GPS reception. Use of a single geo-location server 400 equipped with a GPS receiver 438 for multiple target servers 300 at a data center thus allows the target servers 300 to be located in areas not necessarily conducive to reception of GPS signals or other locating signals. The determined geographical location may then be stored as geo-location value 424 (FIG. 4) within the geo-location server 400.

Upon receiving the RFID message 502, the geo-location server 400 validates the platform RFID (operation 622). In one example, the geo-location server 400 may compare the timestamp noted in the RFID message 502 with the current timestamp maintained within the geo-location server 400. If the difference between received timestamp and the current timestamp is less than some predetermined length of time, such as, for example, an expected amount of time for transmission and processing of the RFID message 502, the geo-location server 400 may validate the platform RFID, as the platform RFID was read in proximity to the geo-location server 400. The geo-location server 400 may also store the platform RFID as the RFID 422 (FIG. 4). In some examples, the geo-location server 400 may be configured to detect tampering and/or disconnection of the wireless communication interface 440 (FIG. 4) of the geo-location server 400, thus potentially invalidating the received RFID message 502 under some circumstances.

Upon validation of the platform RFID, the geo-location server 400 may then associate the determined geographical location with the validated platform RFID (operation 624) to set the geo-location for the target server 300. The geo-location server 400 may then transmit the determined geographical location, the received RFID, and the received timestamp in a geo-location association message 504 (FIG. 5) to the target server 300 (operation 626) to indicate the association of the target server 300 with the determined geographical location. In one example, the geo-location server 400 encodes and/or encrypts the geo-location association message 504 prior to transmission.

The target server 300, upon receiving the geo-location association message 504, may then validate the included geo-location value (operation 628). In one example, the target server 300 may perform this task by validating the identity of the geo-location server 400 sourcing the message.

In some implementations, the management engine 318 of the target server 300 may compare the UM received in the geo-location association message 504 with the RFID 322 (FIG. 3) stored by the management engine 318 to ensure the accompanying geographical location is intended to be applied to the target server 300.

Additionally, the management engine 318 may compare the received timestamp related to the received RFID with the current time maintained in the target server 300 to further validate the geo-location value. If the difference between the received timestamp and the current time is less than some predetermined length of time, the geo-location server 400 is likely to be in proximity to the target server 300, thus indicating that the geo-location value remains applicable to the target server 300.

As part of the validation of the received geo-location value, the management engine 318 of the target server 300 may store the received geo-location value as the geo-location value 324, and may also store the received timestamp as the timestamp 326 (FIG. 3). In some implementations, the target server 300 may service future requests from external devices for the geo-location of the target server 300 with the stored geo-location value 324. Furthermore, the management engine 318 may store the geo-location value 324 in the TPM 332 so that TPM-enabled applications may have access to that information.

In response to the validation of the received geo-location value, the management engine 318 of the target server 300 may begin generating and transmitting a periodic "heartbeat" message 506 (FIG. 5) to the geo-location server 400 to attest to the continued existence of the target server 300 at the determined geo-location (operation 632). In one instance, the target server 300 transmits the heartbeat message 506 once every five minutes, although any time period that may satisfy a subscriber SLA specifying one or more geo-location restrictions may be utilized in other implementations. In some examples, the heartbeat message 506 includes the GUID 320 of the target server 300 to indicate the source of the heartbeat message 506. The target server 300 may also include other information in the heartbeat message 506, such as the RFID 322 (FIG. 3) and/or the current time maintained in the target server 300. The heartbeat message 506 may also be encoded or encrypted to prevent interception or manipulation of the included information.

In response to the first heartbeat message 506, the geo-location server 400 may transmit a geo-location message 508 including the geo-location value to the CMDB 510 (FIG. 5) (operation 633) to make the geo-location of the target server 300 available to other devices or systems, such as the cloud appliance API 116 and the cloud broker 104 of FIG. 1. As with other messages discussed above, the geo-location message 508 may be encoded or encrypted. In another example, the geo-location server 400 may transmit the geo-location value to the CMDB 510 in response to associating the determined geographical location with the platform RFID of the target server 300 (operation 624). In at least some instances, the geo-location message 508 includes some identification of the target server 300, such as the GUID of the target server 300.

Also in response to the validation of the received geo-location value, the management engine 318 of the target server 300 may begin monitoring one or more of the wired connections of the target server 300 with external systems (operation 630), such as power sources and communication interfaces. More specifically, the management engine 318 may monitor the connection of the power supply 336 (FIG. 3) with an electrical outlet 340, as well as the connection of the network interface controller 334 (FIG. 3) with the wired network 345. If the management engine 318 detects a disconnection of an external system, the management engine 318 may cease the transmission of the heartbeat messages (operation 634) to indicate to the geo-location server 400 that the current geo-location of the target server 300 cannot be verified. In addition, the management engine 318 may set the stored geo-location value 324 to an "unknown" state, and possibly note the current time as the stored timestamp 326. The management engine 318 may also update the TPM 332 of the target server 300 accordingly.

In addition, the target server 300 may generate an alert message to the geo-location server 400 in response to the detection of the disconnection, thus more immediately indicating the lack of confidence in the current geo-location associated with the target server 300. In one example, the target server 300 may include the stored GUID 320, RFID 322, and/or a timestamp 326 of the current time in the alert message.

In response to either an absence of the heartbeat message 506 for some predetermined minimum length of time subsequent to the most recently received heartbeat message 506, or to the reception of an alert message from the target server 300, the geo-location server 300 may dissociate the geo-location information from the target server 300 (operation 635) and update the CMDB 510 (FIG. 5) (operation 636) to indicate that the geo-location of the target server 300 currently cannot be confirmed. Thus, the CMDB 510 receives updated geo-location information for the target server 300 immediately after an indication that the geo-location of the target server 300 may have changed, thus making the geo-location information available to any subscriber system interested in employing the target server 300 for a particular task.

After dissociation of the geo-location from the target server 300, the geo-location server 400 may then attempt to reestablish the geo-location of the target server 300, such as by attempting to determine the geographical location of the geo-location sever 400 (operation 621) and/or by alerting a user to rescan the RFID tag 350 of the target server 300 (operation 618). In other examples, periodic determination of the geographical location and/or scanning of the RFID tag 350 may occur regardless of whether the target server 300 is associated with a currently valid geo-location.

In at least some of the various embodiments presented herein, geo-location of computing resources, including, but not limited to the cloud servers discussed herein, is performed automatically in a secure manner with little human intervention, thus reducing or eliminating the potential for human error or intentional misrepresentation regarding the geographical location of the resources. Also, changes to the geo-location status of each resource is detected and reported immediately, reducing or eliminating time periods in which the geo-location information is inaccurate or misleading, and allowing run-time querying of the geo-location information at the discretion of the requestor and according to demanding audit and compliance requirements that may be specified in a service-level agreement between service providers and subscribers.

In some cases, the portions of the system involved in the determination and monitoring of the geo-location information are performed by circuits capable of operating under low-power conditions, which are typical for resources operating in an idle or standby state. As a result, the acquisition and monitoring of geo-location information remains available for idle system resources, thus eliminating the need to power up a resource simply to provide the associated geo-location information. Such capability may be important in cloud computing systems, in which many such resources may reside in a low-power state for extended periods to satisfy typical cloud computing requirements of providing large computing capacity within a short period of time with little advance warning, while simultaneously reducing data center power consumption as much as possible.

In addition, the geo-locating systems and methods discussed above may be deployed independent of the operating system of the computing resource involved, thus eliminating the need to design and upgrade different geo-location systems for each supported operating system. Moreover, the geo-location system may operate in the absence of an installed operating system, thus allowing the generation of geo-location information for systems prior to operating system deployment. Such capability may be important in cases in which the particular operating system to be loaded is dependent on the geo-location of the platform.

In at least some environments, the frequency at which the geo-location of a resource is established is reduced significantly due the constant monitoring of the wired connections of the resource to external systems, and thus may cause reestablishment of the geo-location only upon detection of a disconnection.

The various operations of example methods described herein may be performed, at least partially, by one or more processors, such as the management processors described above, that are temporarily configured (for example, by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

In one embodiment, a computing device includes a communication interface to receive a notification of a geographical location being associated with the computing device from a second computing device. The computing device also includes control circuitry to transmit periodically to the second computing device a message in response to receiving the notification of the geographical location being associated with the computing device, to detect a disconnection of a wired connection between the computing device and an external system, and to cease the periodic transmission of the message in response to the detection of the disconnection of the wired connection.

In one example, the message includes at least one of an indication of the geographical location and an identifier of the computing device.

In one example, including all preceding examples, the control circuitry is to generate a second message indicating the geographical location of the computing device being unknown in response to the detection of the disconnection, and the communication interface is to transmit the second message.

In one example, including all preceding examples, the wired connection includes a connection between the computing device and an external power source to provide power to the computing device.

In one example, including all preceding examples, the wired connection includes a connection between the computing device and the external system to facilitate communication therebetween.

In one example, including all preceding examples, the control circuitry is to validate the received notification of the geographical location, the periodic transmission of the message being in response to the validation.

In one example, including all preceding examples, the computing device includes a tag physically attached to the computing device, the tag including an electronically-readable identifier, and data storage to store the electronically-readable identifier. In this example, the communication interface is to receive the electronically-readable identifier with the notification of the geographical location, and the control circuitry is to validate the received notification of the geographical location of the computing device by matching the electronically-readable identifier stored in the data storage with the received electronically-readable identifier.

In one example, including all preceding examples, the communication interface is to receive a timestamp with the notification of the geographical location, and the control circuitry is to validate the received notification of the geographical location by determining the received timestamp is within a predetermined length of time of a current time value maintained at the computing device.

In one example, including all preceding examples, the received notification of the geographical location includes an indication of the geographical location, the control circuitry is to store the received indication of the geographical location in the data storage, the communication interface is to receive a request for the indication of the geographical location, and the control circuitry is to provide the geographical location via the communication interface in response to the request.

In another embodiment, a computing device includes a location circuit to determine a geographical location of the computing device, a first communication interface to receive an identifier of a second computing device, control circuitry to associate the geographical location with the second computing device, and a second communication interface to transmit to the second computing device a notification of the geographical location being associated with the second computing device, and to receive messages periodically from the second computing device responsive to the transmission of the notification. The control circuitry is to dissociate the geographical location from the second computing device based on an elapsed period of time since reception of a most recent one of the messages exceeding a predetermined period of time.

In one example, the second communication interface is to transmit the associated identifier of the second computing device with the notification of the geographical location to the second computing device.

In one example, including all preceding examples, the second communication interface is to receive a second message from the second computing device, and the control circuitry is to dissociate the geographical location from the second computing device in response to the second message.

In one example, including all preceding examples, the first communication interface includes a wireless communication interface and possesses a communication range that is limited to a predefined maximum geographical distance.

In one example, including all preceding examples, the notification of the geographical location includes an indication of the geographical location, and the control circuitry is to provide the indication of the geographical location in association with the identifier of the second computing device to an external device.

In one example, including all preceding examples, the control circuitry is to provide an indication of the dissociating of the geographical location from the second computing device to the external device.

In one example, including all preceding examples, the location circuit includes a global positioning system circuit.

In another embodiment, a method includes determining, at a first computing device, a geographical location of the first computing device; accessing, at the first computing device, an identifier of a second computing device; associating the geographical location with the second computing device in the first computing device; transmitting, from the first computing device to the second computing device, a notification of the geographical location being associated with the second computing device; receiving, at the second computing device, the notification of the geographical location; periodically transmitting, from the second computing device to the first computing device, a message in response to receiving the notification of the geographical location; detecting, at the second computing device, a disconnection of a wired connection between the second computing device and an external system; ceasing the periodic transmission of the message in response to the detecting of the disconnection; and dissociating, at the first computing device, the geographical location from the second computing device based on an elapsed period of time since reception of a most recent one of the messages exceeding a predetermined period of time.

In one example, the external system includes an external power source providing electrical power to the second computing device via the wired connection.

In one example, including all preceding examples, the external system includes a communication device communicating with the second computing device via the wired connection.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A computing device comprising:
a communication interface to receive a notification of a geographical location being associated with the computing device from a second computing device; and
control circuitry to:
transmit periodically to the second computing device a message in response to receiving the notification of the geographical location being associated with the computing device;
detect a disconnection of a wired connection between the computing device and an external system; and
cease the periodic transmission of the message in response to the detection of the disconnection of the wired connection;
the control circuitry to validate the received notification of the geographical location, the periodic transmission of the message being in response to the validation; and
the communication interface to receive a timestamp with the notification of the geographical location, the control circuitry to validate the received notification of the geographical location by determining the received timestamp is within a predetermined length of time of a current time value maintained at the computing device.

2. The computing device of claim 1, the message comprising at least one of an indication of the geographical location and an identifier of the computing device.

3. The computing device of claim 1, the control circuitry to generate a second message indicating the geographical location of the computing device being unknown in response to the detection of the disconnection, and the communication interface to transmit the second message.

4. The computing device of claim 1, the wired connection comprising a connection between the computing device and an external power source to provide power to the computing device.

5. The computing device of claim 1, the wired connection comprising a connection between the computing device and the external system to facilitate communication therebetween.

6. The computing device of claim 1, further comprising:
a tag physically attached to the computing device, the tag comprising an electronically-readable identifier; and
data storage to store the electronically-readable identifier;
the communication interface to receive the electronically-readable identifier with the notification of the geographical location; and
the control circuitry to validate the received notification of the geographical location of the computing device by matching the electronically-readable identifier stored in the data storage with the received electronically-readable identifier.

7. The computing device of claim 1, the received notification of the geographical location comprising an indication of the geographical location, the control circuitry to store the received indication of the geographical location in the data storage, the communication interface to receive a request for the indication of the geographical location, and the control circuitry to provide the geographical location via the communication interface in response to the request.

8. A computing device comprising:
a location circuit to determine a geographical location of the computing device;
a first communication interface to receive an identifier of a second computing device;

control circuitry to associate the geographical location with the second computing device; and a second communication interface to transmit to the second computing device a notification of the geographical location being associated with the second computing device, and to receive messages periodically from the second computing device responsive to the transmission of the notification;

the control circuitry to dissociate the geographical location from the second computing device based on an elapsed period of time since reception of a most recent one of the messages exceeding a predetermined period of time.

9. The computing device of claim 8, the second communication interface to transmit the associated identifier of the second computing device with the notification of the geographical location to the second computing device.

10. The computing device of claim 8, the second communication interface to receive a second message from the second computing device, the control circuitry to dissociate the geographical location from the second computing device in response to the second message.

11. The computing device of claim 10, the control circuitry to provide an indication of the dissociating of the geographical location from the second computing device to an external device in response to the second message.

12. The computing device of claim 8, the first communication interface being a wireless communication interface and possessing a communication range that is limited to a predefined maximum geographical distance.

13. The computing device of claim 8, the notification of the geographical location comprising an indication of the geographical location, the control circuitry to provide the indication of the geographical location in association with the identifier of the second computing device to an external device.

14. The computing device of claim 13, the control circuitry to provide an indication of the dissociating of the geographical location from the second computing device to the external device.

15. The computing device of claim 8, the location circuit comprising a global positioning system circuit.

16. A method comprising:

determining, at a first computing device, a geographical location of the first computing device;

accessing, at the first computing device, an identifier of a second computing device;

associating the geographical location with the second computing device in the first computing device;

transmitting, from the first computing device to the second computing device, a notification of the geographical location being associated with the second computing device;

receiving, at the second computing device, the notification of the geographical location;

periodically transmitting, from the second computing device to the first computing device, a message in response to receiving the notification of the geographical location;

detecting, at the second computing device, a disconnection of a wired connection between the second computing device and an external system;

ceasing the periodic transmission of the message in response to the detecting of the disconnection; and dissociating, at the first computing device, the geographical location from the second computing device based on an elapsed period of time since reception of a most recent one of the messages exceeding a predetermined period of time.

17. The method of claim 16, the external system comprising an external power source providing electrical power to the second computing device via the wired connection.

18. The method of claim 16, the external system comprising a communication device communicating with the second computing device via the wired connection.

19. At least one non-transitory computer-readable medium comprising instructions that, in response to being executed on a first computing device and a second computing device, cause the first computing device and the second computing device to:

determine, at the first computing device, a geographical location of the first computing device;

access, at the first computing device, an identifier of the second computing device;

associate the geographical location with the second computing device in the first computing device;

transmit, from the first computing device to the second computing device, a notification of the geographical location being associated with the second computing device;

receive, at the second computing device, the notification of the geographical location;

periodically transmit, from the second computing device to the first computing device, a message in response to receiving the notification of the geographical location;

detect, at the second computing device, a disconnection of a wired connection between the second computing device and an external system;

cease the periodic transmission of the message in response to the detecting of the disconnection; and dissociate, at the first computing device, the geographical location from the second computing device based on an elapsed period of time since reception of a most recent one of the messages exceeding a predetermined period of time.

20. The at least one non-transitory computer-readable medium of claim 19, the external system comprising an external power source providing electrical power to the second computing device via the wired connection.

21. The at least one non-transitory computer-readable medium of claim 19, the external system comprising a communication device communicating with the second computing device via the wired connection.

* * * * *